UNITED STATES PATENT OFFICE.

ALBERT BRIDGES, OF JERSEY CITY, NEW JERSEY.

IMPROVEMENT IN LUBRICATING TALC FOR MACHINERY.

Specification forming part of Letters Patent No. 125,016, dated March 26, 1872.

*To all whom it may concern:*

Be it known that I, ALBERT BRIDGES, of Jersey City, in the county of Hudson and State of New Jersey, have invented an Improved Lubricating-Compound; and the following is declared to be a correct description thereof.

Efforts have been made to employ plumbago and soap-stone in connection with greasy substances to form a lubricating-compound for shafts, boxes, bearings, &c., but with soap-stone it is found that there are gritty particles, such as silica and foreign substances, that act to cut out the metal, and this is somewhat the case with the coarser qualities of plumbago. The cost of this plumbago is too great for it to be employed as a lubricant, and, beside, the oil and plumbago will not mix in such a manner as to flow freely, but the mass becomes coagulated.

My invention is made for applying an anti-friction coating to the metallic surfaces in contact, which coating is not easily removed, but protects the metallic surfaces in contact from abrasion and heating in a better manner than the materials heretofore employed.

I have discovered that the mineral known as talc, especially the greenish partially translucent material, when ground to a fine powder will adhere to metallic surfaces in contact, and form a dry lubricant, and one that will not be washed or floated off such surface when oil or other lubricating material is mixed therewith.

I take the aforesaid talc in the form of an impalpable powder, or nearly so, and mix it with oil, tallow, or other greasy material, and apply the same in a plastic or semi-liquid condition to the parts to be lubricated.

The effect of this material is that the unctuous talc powder adheres to the metallic surfaces, and not only acts as a lubricating material, but also as a vehicle to retain oil between the surfaces in contact.

With lubricating material where the same has to be poured from a can, the proportion of talc to oil will be less than that for axle-boxes where the plastic mass of tallow and talc is to be filled entirely into the box.

I claim as my invention—

The lubricating-compound composed of the ingredients specified, for the purposes set forth.

Signed by me this 3d day of January, A. D. 1872.

ALBERT BRIDGES.

Witnesses:
  GEO. T. PINCKNEY,
  CHAS. H. SMITH.